United States Patent
Tseng

(10) Patent No.: US 6,740,988 B2
(45) Date of Patent: May 25, 2004

(54) ENERGY GENERATION DEVICE FOR MOBILE CARRIERS

(76) Inventor: Hong-Li Tseng, No. 4, Hsiao Chung St., Tainan (TW)

( * ) Notice: Subject to any disclaimer, the term of this patent is extended or adjusted under 35 U.S.C. 154(b) by 0 days.

(21) Appl. No.: 10/161,881

(22) Filed: Jun. 4, 2002

(65) Prior Publication Data

US 2003/0222518 A1 Dec. 4, 2003

(51) Int. Cl.⁷ .................................................. B60K 1/00
(52) U.S. Cl. ........................................ 290/44; 290/55
(58) Field of Search ............................. 290/44, 55, 42, 290/43, 53

(56) References Cited

U.S. PATENT DOCUMENTS

| | | | |
|---|---|---|---|
| 3,876,925 A | * | 4/1975 | Stoeckert ........................ 322/1 |
| 4,817,332 A | * | 4/1989 | Ikeda et al. .................... 47/17 |
| 5,272,378 A | * | 12/1993 | Wither ........................ 290/1 R |
| 5,280,827 A | * | 1/1994 | Taylor et al. ................ 180/165 |
| 5,287,004 A | * | 2/1994 | Finley ........................... 290/55 |
| 5,850,108 A | * | 12/1998 | Bernard ........................ 290/54 |
| 5,907,192 A | * | 5/1999 | Lyons et al. .................. 290/44 |
| 5,920,127 A | * | 7/1999 | Damron et al. ............... 290/44 |
| 2003/0052487 A1 | * | 3/2003 | Weingarten .................. 290/54 |

* cited by examiner

*Primary Examiner*—Nicholas Ponomarenko
(74) *Attorney, Agent, or Firm*—Stroock & Stroock & Lavan LLP

(57) ABSTRACT

An energy generation device for mobile carriers is disclosed. The mobile carrier moves in a fluid environment. The disclosed device contains a rotating mechanical unit, a power generation unit, and a power storage unit. The rotating mechanical unit is connected to the surface of the mobile carrier, and is exposed in the fluid environment for converting the fluid kinetic energy into rotational energy. In addition, the power generation unit converts the rotational energy into electrical energy, which is then stored in the power storage unit.

18 Claims, 6 Drawing Sheets

ENERGY GENERATION DEVICE FOR MOBILE CARRIERS

BACKGROUND OF THE INVENTION

1. Field of Invention

The invention pertains to an energy generation device and, in particular, to an energy generation device for mobile carriers.

2. Related Art

With the rapid growth in commercial activities and living needs in recent years, people have higher demands and dependence upon electricity. Therefore, both civil and industrial power consumption growths face severe problems. In view of the limited energy resources on the Earth, it is imperative for scientists to find new substitute energy.

Currently, electricity is generated mainly from nuclear power, coals, oil, gas, wind, ground heat, and solar energy. There are pros and cons for nuclear power usage; its further development, in particular, has caused a long-term debate. As to waterpower, most of the water resources have been utilized and the impact of waterpower to Nature is always criticized; its future is also very limited. On the other hand, the environmental pollution and greenhouse effect due to burning coals are yet solved, either.

Facing foreseeable energy shortage in the future and under the situation of being unable to find new substitute energy, it is of consequence to increase the use efficiency of every kind of energy as well as to develop new energies at the same time.

SUMMARY OF THE INVENTION

In observation of the drawbacks pointed out before, an objective of the invention is to provide an energy generation device.

Another objective of the invention is to provide an energy generation device for mobile carriers to increase the energy use efficiency.

A further objective of the invention is to provide an energy generation device for mobile carriers. The wind power encountered by the mobile carrier is taken as the alternative source of energy.

Pursuant to the above-mentioned objectives, the invention discloses an energy generation device for a high-speed carrier. The high-speed carrier moves at a high speed in a fluid environment. The device includes a rotating mechanical unit, a power generation unit, and a power storage unit. The rotating mechanical unit is installed any position on the high-speed carrier that is in contact with the fluid environment for converting the kinetic energy of the high-speed fluid into rotational energy. The power generation unit is used to convert the rotational energy into electrical energy. The power storage unit is used to store the electrical energy produced by the power generation unit.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

Based upon the above-mentioned objectives, this specification discloses an energy generation device for a mobile carrier to increase energy use efficiency and to generate alternative energy. The mobile carrier has motion in a fluid environment. It can be any moving tool moving in the atmospheric environment. For example, trains on the railroad, trucks on the highway, or even aircrafts flying at a high altitude can use the disclosed energy generation device.

Conventionally, people often take the attitude of trying to avoid the drag encountered by mobile carriers in motion. For example, carriers with a streamline shape are designed to lower the drag in a fluid environment. However, the energy recycle device disclosed herein makes use of the potential power inside the wind. That is, the invention utilizes the encountered resistance to drive a rotational device, turning the resistance or drag into useful kinetic energy that can be converted into electrical power.

Figure 1:
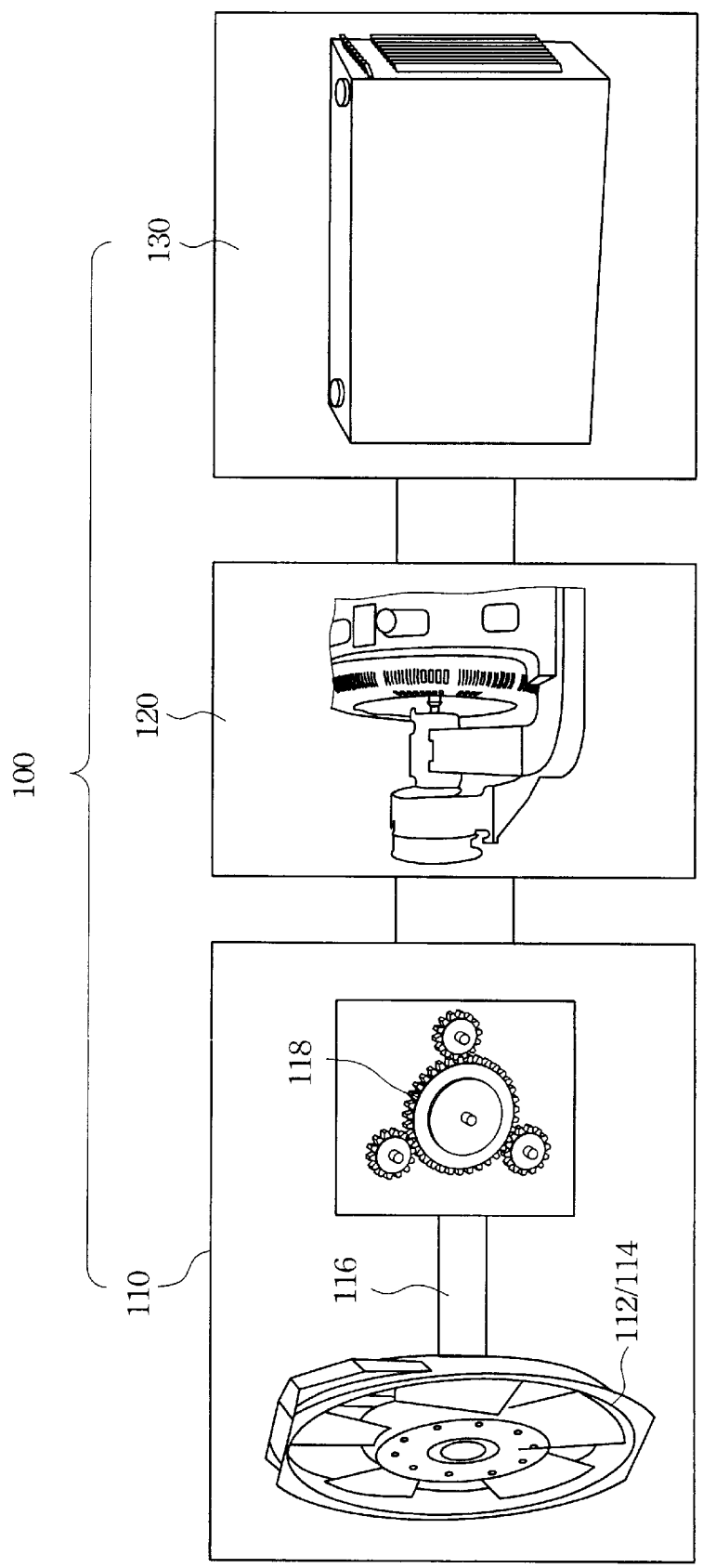
FIG. 1 is a schematic view of the disclosed energy recycle system.
Figure 2A:
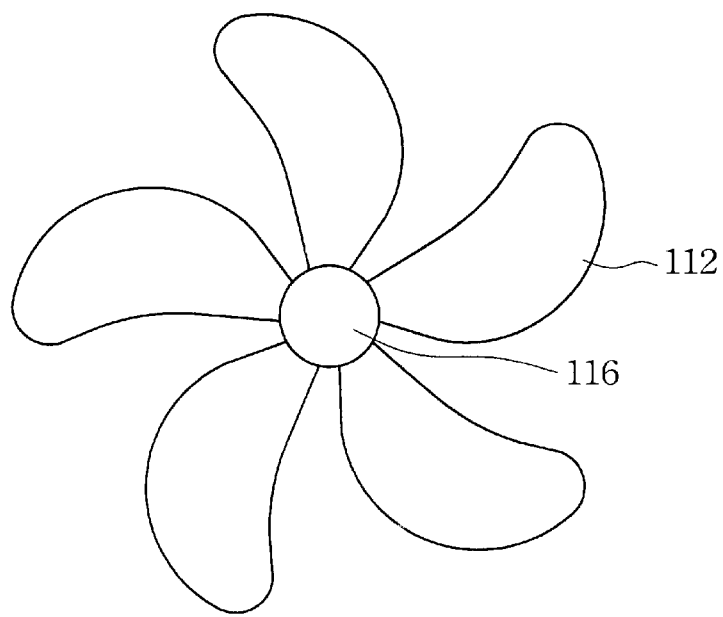
FIG. 2A is a schematic view of the fan in the disclosed rotational mechanic unit.
Figure 2B:
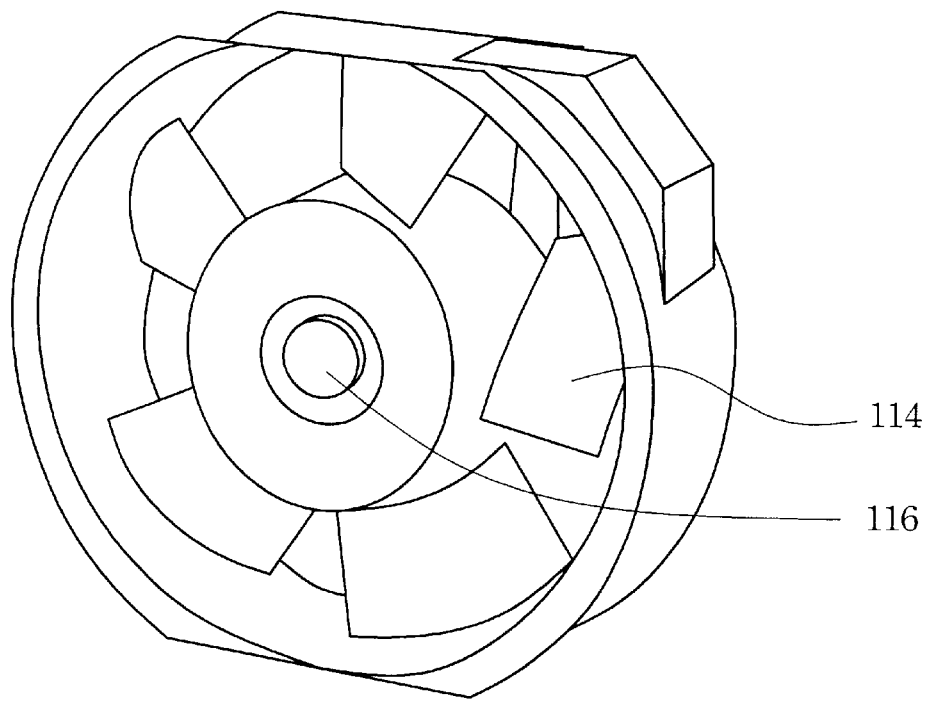
FIG. 2B is a schematic view of the blade set in the disclosed rotating mechanical unit.

Explicitly speaking, as shown in FIG. 1, the energy generation device 100 of the invention contains at least one rotating mechanical unit 110, a power generation unit 120, and a power storage unit 130. The rotating mechanical unit 110 is installed on any position on the mobile carrier that is in contact with a fluid environment. Its purpose is to convert the kinetic energy of the fluid flowing by the surface of the mobile carrier into the rotational energy of the rotating mechanical unit 110. For example, the rotating mechanical unit 110 may be a vertical rotational unit with a fan set 112 or a blade set 114, as shown in FIGS. 2A and 2B, respectively. Such configurations are featured in that the vertical axis of the rotation plane is roughly parallel to the flowing direction of the external fluid. The vertical rotating mechanical unit further contains a rotational axis installed with a plurality of blades or fans. The fans or blades may also be installed on the rotational axis through rotatable joints so that the fans or blades can rotate to reach a maximum airflow cross-section for the largest possible power output.

Since the fluid flowing outside the carrier surface carries a large momentum and kinetic energy, it can readily bring a fan set or a blade set into high-speed rotational motion. Moreover, the root of the fan set or blade set is connected to a central axis 116. According to a preferred embodiment, the central axis 116 is further connected to a speed-reduction gear set 118 for reducing the rotational speed of the central axis 116. The gear set 118 uses a power transmission axis (not shown) to connect to the power generation unit 120 for generating electrical power.

With reference to FIG. 1, the power generation unit 120 of the disclosed energy generation device 100 is connected to the power transmission axis of the rotating mechanical unit 110, driving the rotating mechanical unit 110 to convert its rotational energy into electrical power. The power generation unit 120 utilizes the usual power generation principle. That is, the rotational energy of the rotating mechanical unit 110 brings the conductive coil inside the power generation unit 120 into rotation, cutting the magnetic field lines produced by the magnet set. The conductive coil thus induces an emf (electromotive force) due to cutting the magnetic field lines. Therefore, the mechanical energy is converted into electrical power for output. The output electrical power is then stored in the power storage unit 130 of the energy generation device 100 of the invention. The power storage unit 130 can be a normal battery.

On the other hand, in a preferred embodiment of the invention, the energy generation device can be installed on a train, a truck or an aircraft. Aside from the fact that rotating mechanical units for different mobile carriers have different forms, other electrical power generation units and power storage units are similar to the one described above. Therefore, we do not explain these examples in further detail. Let's concentrate on the rotating mechanical unit for different mobile carriers in the following paragraphs.

Embodiment 1

Figure 3:
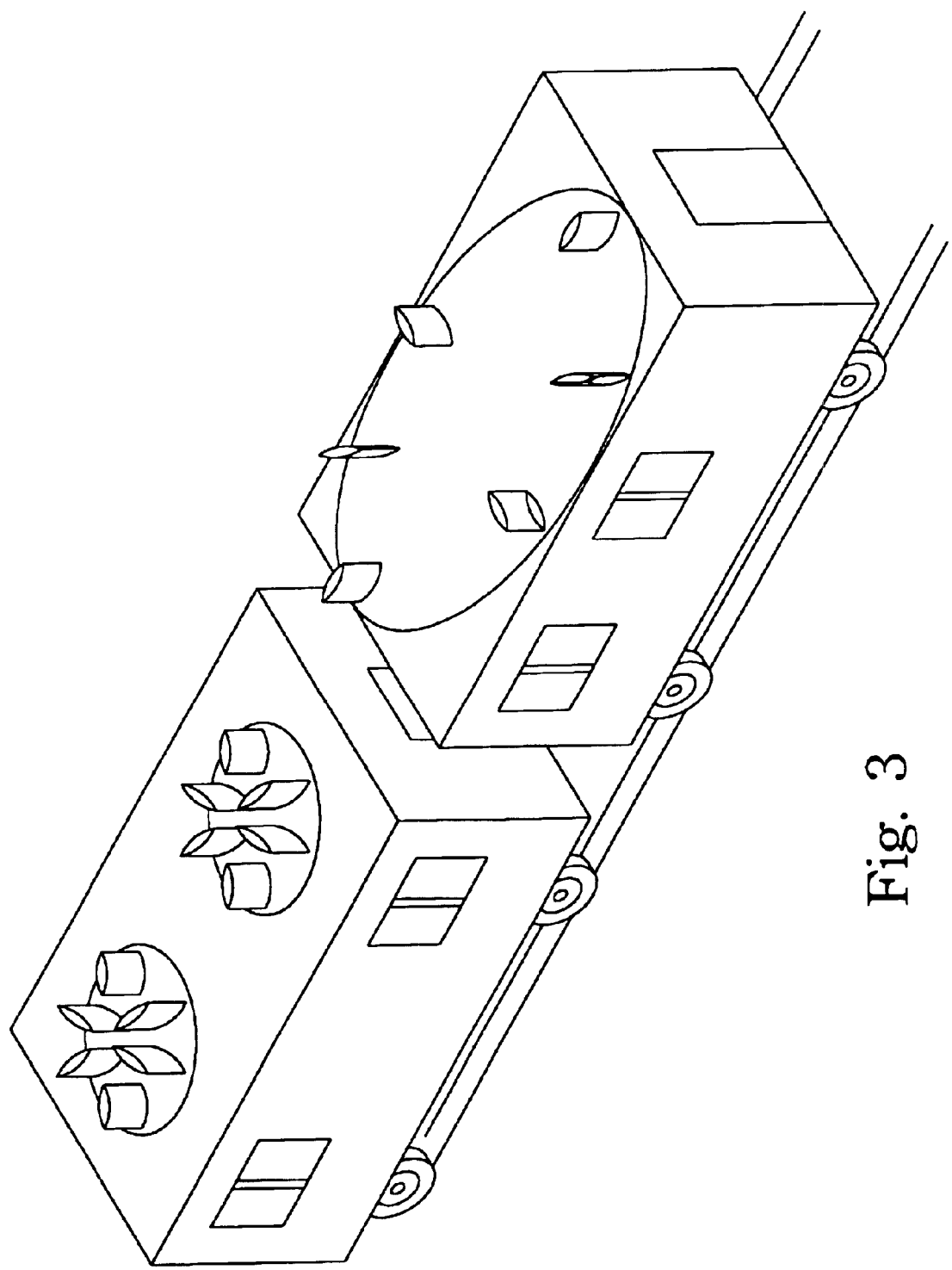
FIG. 3 is a schematic view of the disclosed energy generation device installed on the top body of a train.

Take the train as an example. The rotating mechanical unit of the energy generation device is installed at a position on the train that is in contact with the flowing air. For instance, it can be installed on top body of a train or in front of a locomotive. In particular, the top and side surfaces of the train can be installed with the vertical rotating mechanical unit as shown in FIGS. 2A and 2B or even a horizontal rotating mechanical unit as shown in FIG. 3. A feature of the horizontal rotating mechanical unit is that when the mechanical unit is rotating, the axis vertical to the rotation surface is also roughly perpendicular to the flowing direction of the external fluid. The energy generation device utilizes the wind power of the flowing air due to the moving train. The horizontal rotating mechanical unit converts the wind power into rotational energy. The horizontal rotating mechanical unit contains at least one annular rotating disk, such as an elliptical rotating disk or a circular rotating disk. The outer rim of the rotating disk is installed with a plurality of blades, each of which is mounted through a rotatable axis on the rotating disk. Therefore, the blades can automatically adjust their angles in response to the incoming wind. Explicitly speaking, blades on one side of the rotating disk rotate to produce a maximal airflow cross-section, absorbing most of the wind power. At the same time, the blades on the other side are along with the wind so that the blades rotate to the minimal airflow cross-section, reducing the encountered resistance. It should be mentioned that when applying the invention to the train, several trains can be installed with power storage units to save electrical energy. More particularly, when applying the invention to a long-journey train while the power storage unit can only store limited electrical power, the excess electrical power may be sent out through the power transmission cable for electric trains. In addition, the horizontal rotating mechanical unit of the embodiment can be hidden inside the train. It comes out for generating electrical power only when in use.

Embodiment 2

Figure 4:
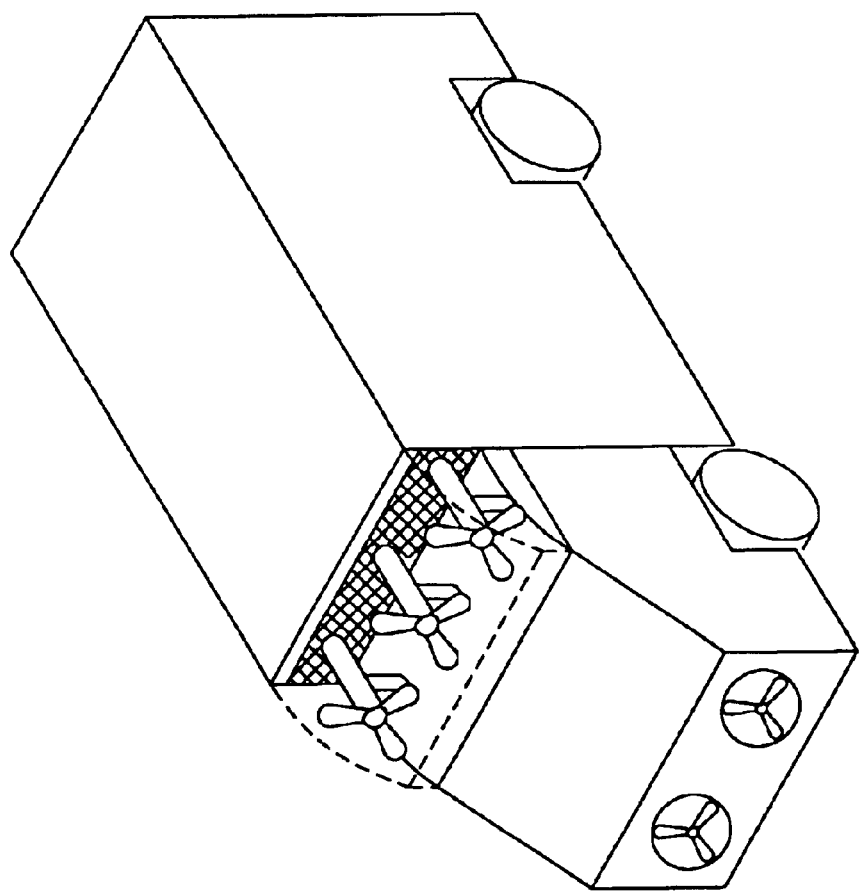
FIG. 4 is a schematic view of the disclosed energy generation device installed on the top body of a truck.

If the energy generation device is installed on a truck, the rotating mechanical unit can be installed at any position on the truck that has contact with flowing air. For example, it can be installed on the top body or in front of the truck. The vertical rotating mechanical units in FIGS. 2A and 2B can be installed in front of the truck and on top body of the trailer, as shown in FIG. 4. The energy generation device utilizes the wind power of the airflow relative to the moving truck and converts it into rotational energy through the vertical rotating mechanical unit. In particular, a rotating axis is installed with several rotatable blades. These blades rotate to a maximal angle of attack so as to increase the torque exerted on the rotating mechanical unit by the wind. It should be mentioned that a power storage unit is installed at an appropriate position on the truck for storing the generated electrical power. More particularly, the stored electrical power may be output to another storage device during a long journey of the truck.

Furthermore, the horizontal rotating mechanical unit disclosed in the first embodiment can be installed on top body or side of the truck to generate electrical power. The rotating mechanical unit is submergible or foldable and can be hidden inside the vehicle when not in use.

Embodiment 3

When applying the invention to an aircraft, the rotating mechanical unit can be installed at any position on the aircraft that is in contact with the flowing air. For example, it may be installed on both wings, the surface of its main body, or at the front end. The energy generation device utilizes the wind power of the airflow relative to the moving aircraft to generate electrical power. The wind power is further converted into rotational energy through a vertical rotating mechanical unit. In particular, a rotating axis is installed with several rotatable blades. These blades rotate to a maximal angle of attack so as to increase the torque exerted on the rotating mechanical unit by the wind. It should be mentioned that a power storage unit is installed at an appropriate position on the aircraft for storing the generated electrical power. More particularly, after a long journey of flight, the stored electrical power may be output to an external power storage device after it lands down.

Figure 5:
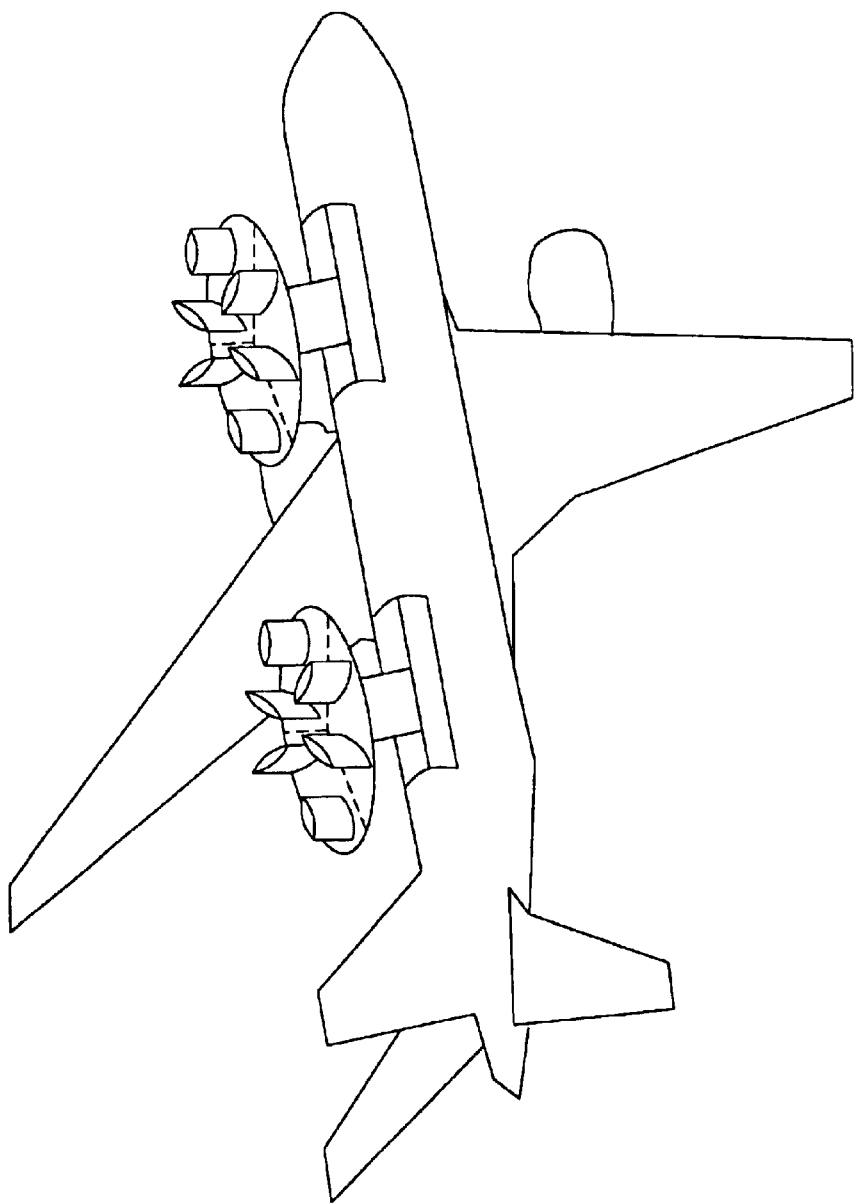
FIGS. 5 and 6 are schematic views of the disclosed energy generation device installed on an aircraft.
Figure 6:
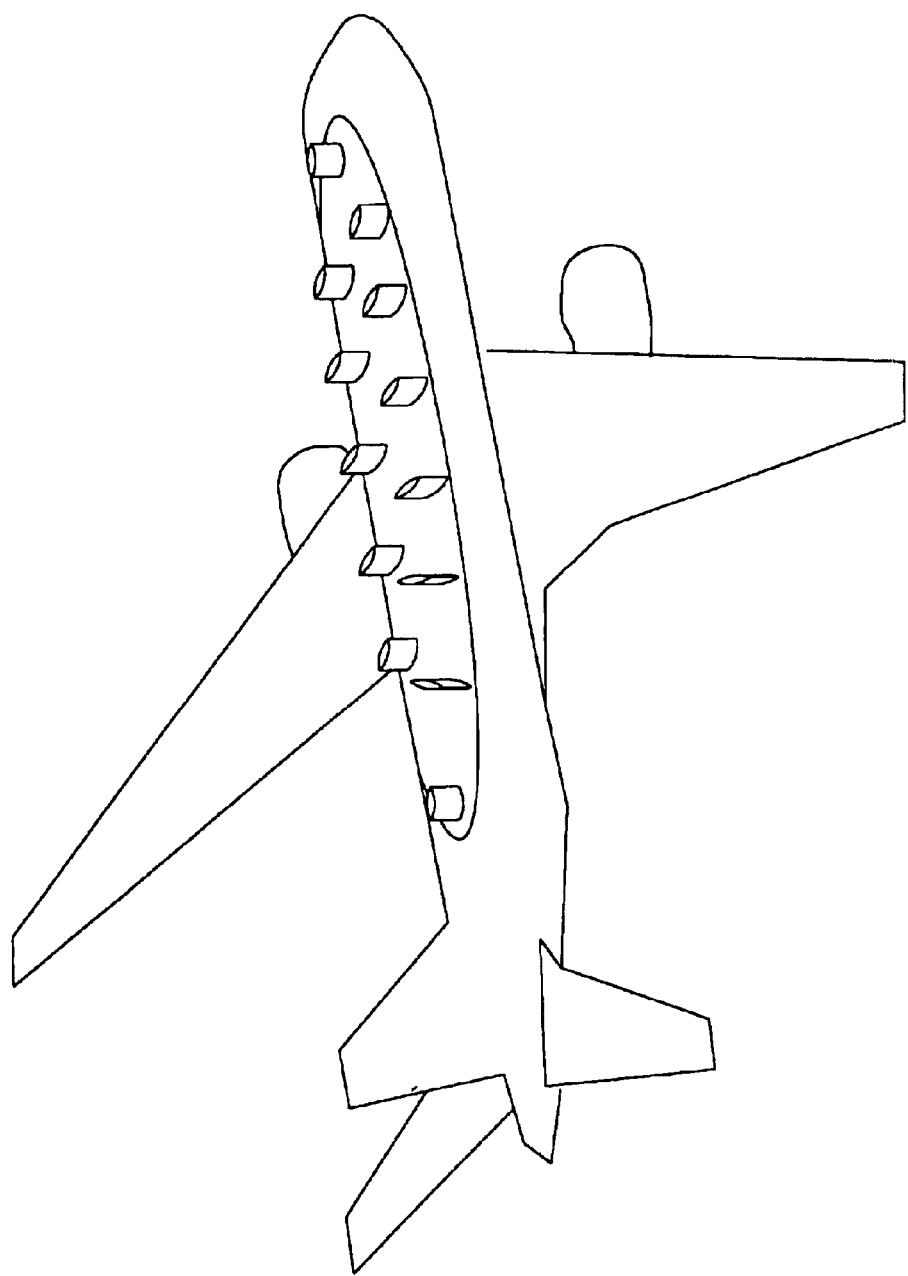

Furthermore, the horizontal rotating mechanical unit disclosed in the first embodiment may be installed on the aircraft body and wings too, as shown in FIGS. 5 and 6. Again, the rotating mechanical unit is submergible or foldable and can be hidden inside the body when not in use.

Basically, when the wind speed is increased by a factor of two, the generated electrical power by the disclosed energy generation device is increased by a factor of eight, a cubic power factor. For example, the energy generation device automatically starts its operation when the wind speed reaches 4 m/s. A power of 660 kW (kilo-Watt) is generated when the wind speed reaches 15 m/s. When applying the invention to a moving vehicle, the wind speed encountered by the disclosed energy generation device is roughly 30 m/s when the vehicle speed reaches 105 km/hr. Thus, the generated electrical power is eight times of 660 kW. In view of this, the electrical power needed for the moving carrier is far under the generated electrical power when, e.g. the moving speed of train over 200 km/hr and the moving speed of aircraft over 800 km/hr.

On the other hand, if one increases the length of the blades in the energy generation device, the generated electrical energy grows in proportion. For example, when the length of the blades increases by a factor of two, the electrical power is also increased by a factor of two. In addition to the automatic start, the disclosed energy generation device also has the functions of automatic rotation in response to the wind, blade angle-of-attack control, and monitoring, protecting the structural strength of the invention.

Moreover, the power storage unit contains a power storage interrupt circuit. After the power storage unit completes the power storage, it disconnects from the power generation unit. In conclusion, the moving carrier installed with the disclosed energy generation device can fully utilize the encountered wind power as the new energy source. Therefore, the invention can extract energy from the Nature without limit and, at the same time, satisfy the requirement for a clean energy production.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An energy generation device for a moving carrier, which is installed at any position on the moving carrier that is in contact with external airflow for using the wind power of the flowing air to generate electrical power, the energy generation device comprising:

a rotating mechanical unit for converting the wind power into rotational energy, which is installed at the location on the moving carrier in contact with external airflow and has a plurality of blades, each of the blades having a rotatable axis for adjusting its angle of attack, wherein the rotating mechanical unit is exposed when the energy generation device is in use or the rotating mechanical unit is hidden inside the moving carrier when the energy generation device is not in a power generation unit for converting the rotational energy into electrical power; and a power storage unit for storing the electrical power produced by the power generation unit.

2. The energy generation device of claim 1, wherein the rotating mechanical unit is selected from the group consisting of the combination of a horizontal rotating mechanical unit and a vertical rotating mechanical unit.

3. The energy generation device of claim 2, wherein the horizontal rotating mechanical unit has a rotating surface with its rotational axis perpendicular to the external airflow, the horizontal rotating mechanical unit further contains a rotating disk for the blades to be installed along its rim through the rotatable axis, and the blades rotate to an angle of attack with the maximal airflow cross-section when they have motion along with the wind to increase the power but to an angle of attack with the minimal airflow cross-section when they have motion against the wind to minimize the resistance.

4. The energy generation device of claim 2, wherein the vertical rotating mechanical unit has a rotating surface with its rotational axis parallel to the external airflow, the vertical rotating mechanical unit further contains a rotating disk for the blades to be installed along its rim through the rotatable axis, and the blades rotate to an angle of attack with the maximal airflow cross-section when they have motion along with the wind to increase the power.

5. The energy generation device of claim 4, wherein the vertical rotating mechanical unit is a rotating fan.

6. The energy generation device of claim 1, wherein the moving carrier is selected from the group consisting of a train, a vehicle, and an aircraft.

7. The energy generation device of claim 6, wherein when the moving carrier is a train, the rotating mechanical unit is installed at a location selected from the top body and the front of the train.

8. The energy generation device of claim 6, wherein when the moving carrier is a vehicle, the rotating mechanical unit is installed at a location selected from the top body and the front of the vehicle.

9. The energy generation device of claim 6, wherein when the moving carrier is an aircraft, the rotating mechanical unit is installed at a location selected from the wings, the body and the front of the aircraft.

10. The energy generation device of claim 1, wherein the rotating mechanical unit further contains a gear set connected to the power generation unit for slowing down the rotational speed of the rotating mechanical unit and making the power generation unit generate electrical power.

11. The energy generation device of claim 10, wherein the gear set further contains a power transmission axis for driving the power generation unit to generate electrical power.

12. The energy generation device of claim 1, wherein the power generating unit is comprised of a coil and a magnet set.

13. The energy generation device of claim 1, wherein the power storage unit is a battery.

14. The energy generation device of claim 10, wherein the power storage unit further contains a power storage interrupt circuit for stopping electrical power storage after the power storage unit is fully charged.

15. The energy generation device of claim 14 further comprising a power output device for outputting the generated electrical power.

16. The energy generation device of claim 1, wherein the moving carrier is an airplane.

17. The energy generation device of claim 1, wherein the moving carrier is a train.

18. The energy generation device of claim 1, wherein the moving carrier is an aircraft.

* * * * *